United States Patent

Bryant et al.

[11] Patent Number: 5,590,366
[45] Date of Patent: Dec. 31, 1996

[54] PACKET FORWARDING SYSTEM FOR MEASURING THE AGE OF DATA PACKETS FLOWING THROUGH A COMPUTER NETWORK

[75] Inventors: Stewart F. Bryant, Redhill, England; Michael J. Seaman, San Jose, Calif.; Christopher R. Szmidt, Reading, England

[73] Assignee: Digital Equipment Corporation, Maynard, Mass.

[21] Appl. No.: 421,141

[22] Filed: Apr. 13, 1995

Related U.S. Application Data

[63] Continuation of Ser. No. 889,551, May 27, 1992, abandoned.

[51] Int. Cl.$^6$ .................................................... G06F 13/00
[52] U.S. Cl. .............. 395/800; 395/200.17; 364/DIG. 1; 364/242.94; 364/239
[58] Field of Search ....................................... 395/200, 800, 395/275, 550, 325, 200.15, 200.17; 370/85.1, 85.7, 60, 94.1, 85, 94.1, 94.3

[56] References Cited

U.S. PATENT DOCUMENTS

| | | | |
|---|---|---|---|
| 4,506,358 | 3/1985 | Montgomery | 370/60 |
| 4,509,073 | 4/1985 | Baron et al. | 370/94 |
| 4,914,653 | 4/1990 | Bishop et al. | 370/85.6 |
| 5,126,999 | 6/1992 | Munter et al. | 370/60 |
| 5,224,099 | 6/1993 | Corbalis et al. | 370/94.2 |
| 5,245,616 | 9/1993 | Olson | 370/60 |
| 5,260,935 | 11/1993 | Turner | 370/60 |

*Primary Examiner*—Mehmet B. Geckil
*Attorney, Agent, or Firm*—Ronald C. Hudgens; Arthur W. Fisher

[57] ABSTRACT

A packet forwarding node for a computer network comprises at least one receiving module and at least one output module including packet list (21) for maintaining a list of packets to be transmitted therefrom. The time for which a packet remains in the node is determined by grouping the packets into groups or "buckets" which are created at regular intervals, each bucket containing packets arriving within the same time interval, and keeping track of the age of each bucket. A bucket counter (33) counts the total number of buckets in existence, so indicating the age of the oldest packet. This counter is incremented by 1 at regular intervals and decremented by 1 each time the oldest bucket is emptied (or found to be empty). A bucket list shift register (30) has its contents shifted at each change of time interval, and its the bottom stage accumulates the number of packets arriving in a time interval, and an overflow accumulator (31) accumulates counts shifted out of its top end. The bucket list shift register may comprise a plurality of sections each of which is shifted at an exact submultiple of the rate of shifting of the previous section, the bottom stage of each section accumulating counts shifted out of the previous section. In an alternative embodiment, bucket boundary markers are inserted into the packet list at each change of time interval.

2 Claims, 2 Drawing Sheets

PACKET FORWARDING SYSTEM FOR MEASURING THE AGE OF DATA PACKETS FLOWING THROUGH A COMPUTER NETWORK

This application is a continuation of application Ser. No. 07/889,551 filed May 27, 1992 now abandoned.

FIELD OF THE INVENTION

This invention is concerned with computer networks, and more specifically with controlling the age of packets in such networks.

BACKGROUND OF THE INVENTION

A computer network, in the present sense, is a network of packet forwarding stations (nodes) by means of which various packet originating and receiving stations (commonly termed host computers, or just hosts) are interconnected. Messages are originated and received by the hosts; the role of the network is to route them between the hosts. A node is generally connected to several others. Each node has an input module for each host and each other node it is connected to, and means for inspecting each incoming packet, to determine which node or host it should forward the packet to. (For present purposes, we need not distinguish between "messages" and "packets".)

A packet consists of a header containing control data, and a body containing the information which is being passed from the originating host to the destination host. The header contains the destination of the packet and various other fields, some of which are modified as the packet passes through the network.

When the packet is received at a node, it is temporarily stored in the node, which inspects the address field of the packet to determine which link it should go out on, and in due course transmits the packet on that link.

The node may conveniently contain a packet memory for the incoming packets and a plurality of output modules, one for each link to other nodes or hosts. A pointer to the location of the incoming packet in the packet memory is passed to the output module of the appropriate link, the pointers of the various packets to be transmitted on that link are queued, and the packets are transmitted in the sequence of the pointers in the queue.

Many computer networks incorporate means for limiting the life of packets in the network. There are various reasons for this; for example, a packet may be held up in the network for a time which is comparable to a typical time-out and resend time of the hosts, the packet may be undeliverable, or there may be a fault in the network which results in the packet circulating round a loop.

One way of limiting the life of a packet is to include in each packet a hop count which is set to some suitable value when the packet is originated (either by the host or on entering the network from the host) and decremented each time the packet passes from one node to the next, the packet being destroyed if its hop count reaches 0. (This way of measuring the life of a packet is of course related somewhat loosely to the chronological age of the packet.)

Another way of limiting the life of a packet is to monitor, in some way, the time for which it exists, and destroy it if it exceeds a predetermined age. The "destruction" of a packet usually involves discarding any references to it and marking the memory space which it occupies as free (so that other packets can be stored in that space).

This can be done by a birthtime technique; including in each packet the time at which it was born. Determining the age of the packet then involves subtracting the time of birth of the packet from the current time, which involves having a system-wide clock. This involves synchronizing clocks in all nodes, which is not always feasible, particularly if the network is large and different parts are under different managements and/or of different designs.

An alternative way of monitoring the time for which a packet exists is the lifetime technique; including in each packet a lifetime which is included in the packet when it is born and which is decremented each time the packet passes through a node by the time which the packet spends in that node. This technique overcomes the synchronization problems of the birthtime technique.

In practice, the time the packet spends in a node is measured in units of predetermined length, and the packet is assumed to spend a minimum of i unit in a node. The time for which a packet exists, measured in this way, is, of course not identical to the chronological age of the packet. One reason for this is the quantization of the time units just mentioned. Another is the problem of accounting for the transmission time between nodes, as it may not be feasible to measure this without synchronization. The time measured in this way is however an adequate approximation to the chronological age of the packet.

In the lifetime technique, one of the fields in the packet header is an age field containing the remaining part of the lifetime of the packet. This is stored, along with the rest of the packet, in the packet memory when the packet is received at the node. When the packet is retrieved from the node for transmission, the age field has to be decremented by the time which the packet has spent in the node. This time is determined by determining the difference between the times at which the packet enters and leaves the node. This requires the time at which the packet enters the node to be recorded, so that it is available when the packet reaches the top of the queue in the output module.

There is no difficulty in principle in doing this. However, in practice this imposes a heavy load on the node; the burden arises largely because the number of packets which may accumulate in a node is large.

The packet arrival time can be stored in the output module, associated with the pointer to the packet itself (which is in the packet memory). However, the pointer and other associated information will generally be only a few words long. This size will have to be increased by a substantial amount to accommodate the packet arrival time as well. The storage capacity of each output module, which will usually have to be fast memory, must therefore be significantly increased.

The packet arrival time can alternatively be stored in the packet memory, along with the packet itself. The packet will usually be very much longer than the packet arrival time field, so although the size of the packet memory has to be increased, this is not an excessive burden. However, the packet memory is normally optimized for serial access. That is, it is designed so that it is fast for reading from or writing into a long sequence of successive memory locations. A packet arrival time will typically be only a few words long, so retrieving packet arrival times will be much closer to random access than serial access for such a memory. The mean speed (bandwidth capacity) of the packet memory is therefore reduced substantially.

In systems in which the nodes have a high through-put, the lifetime technique thus imposes a heavy storage and processing burden on the nodes. In fact, in one commercial system in which the lifetime technique was used, its drawbacks were found to be so severe that the system was modified to use the hop count technique instead.

It is possible to reduce the amount of storage required for the lifetime technique, by storing only the remaining lifetime of the packet and decrementing it on every time unit. However, this obviously imposes a severe processing load, since the lifetime field of every packet in the node has to be read from whatever memory it is stored in, decremented, and written back into memory on every time unit.

The object of the present invention is to provide an implementation of the lifetime technique which substantially reduces the storage and processing burden on the nodes.

SUMMARY OF THE INVENTION

According to the present invention there is provided a packet forwarding station for a computer network comprising at least one receiving module, and at least one output module including packet list means for maintaining a list of packets to be transmitted therefrom and residence time measuring means for determining the time for which each message is resident therein, characterized in that the residence time measuring means comprises timing means for defining successive time intervals, grouping means for grouping the packets into groups ("buckets") in dependence on the time intervals in which they arrive, and age measuring means, including a bucket counter, for maintaining a running record of the ages of the buckets.

DESCRIPTION OF THE DRAWINGS

A node embodying the present invention will now be described by way of example, with reference to the drawings, in which.

DESCRIPTION OF THE PREFERRED EMBODIMENT

Typical network and node

Figure 1:
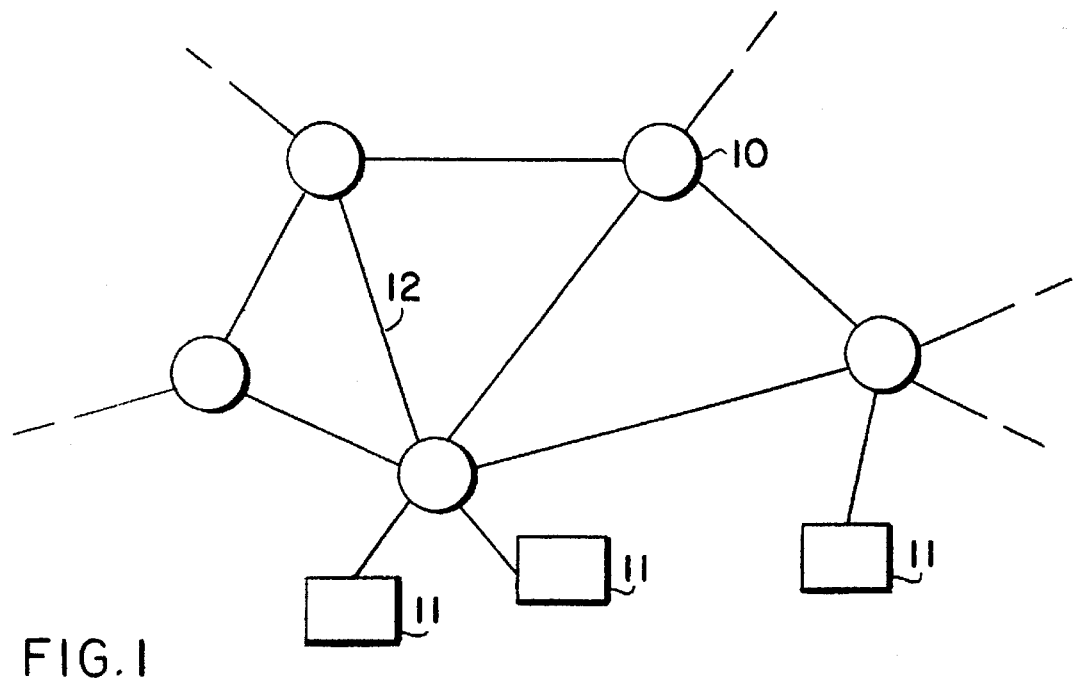
FIG. 1 is a partial block diagram of a computer network.

FIG. 1 shows part of a typical network, comprising a plurality of nodes 10 and hosts 11. The nodes are connected to each other and to the hosts by links 12.

Figure 2:
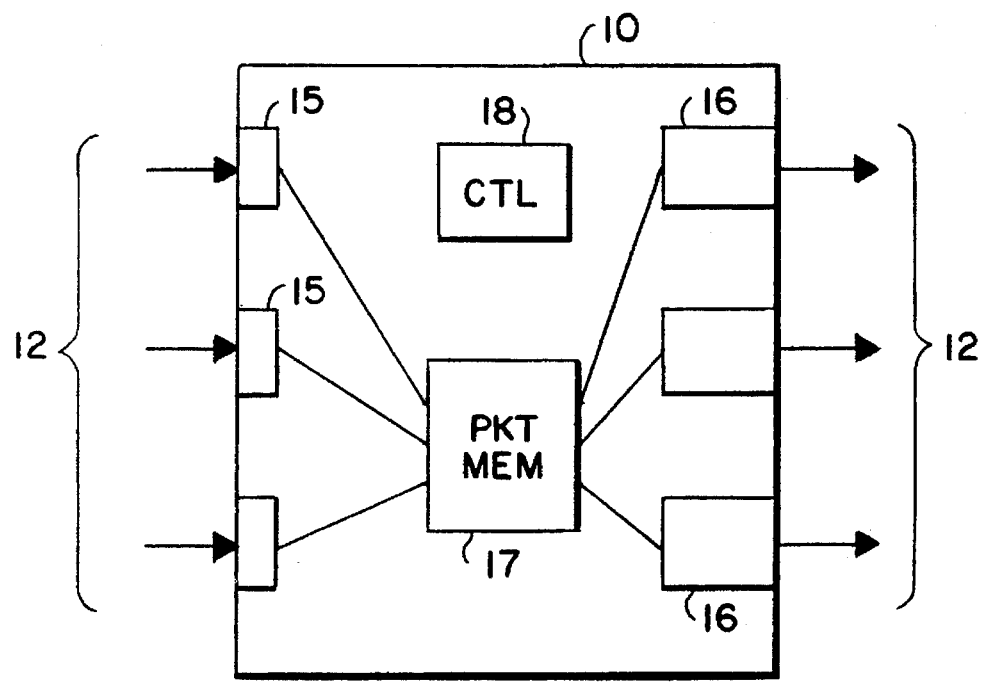
FIG. 2 is a simplified block diagram of a node of the network.

FIG. 2 shows the basic logical organization of a node 10. There is a plurality of input port modules 15 which receive packets in from the links 12, and a plurality of output port modules 16 which transmit packets out to the links 12. In between the input and output modules there is a packet memory 17 for temporarily storing packets which have been received through an input module and are awaiting transmission through an output module. The operation of the input and output modules 15 and 16 and the memory 17 is controlled by a control unit 18.

Considering this in slightly more detail, when an incoming packet is received by the node, the receiving module 15 passes the header to the control unit 18 as well as passing the entire packet to the memory 17. The control unit 18 compares the packet destination with routing information stored in unit 18 to determine which link the packet should be sent out on. It then generates a pointer to the packet in the memory 17, and passes this pointer on to the output module 16 for the appropriate link.

It may well happen that several packets come into the node more or less simultaneously, on different links, for transmission out on the same link. Also, the links do not necessarily all have the same speed (bandwidth), so several consecutive packets may come into a node over a single fast link, all for onward transmission over a single slow link. The node must therefore be able to temporarily store a number of packets for transmission out over the same link. This involves storing the packets themselves and also control information identifying them and their output links.

The packets themselves are stored in the memory 17, but the control information is stored in the output modules 16. Each output module contains a packet queue, which contains the pointers to the packets which are to go out on the associated link. Each pointer in turn is taken from the queue and the corresponding packet transmitted.

Output module: pointer queue list

Figure 3:
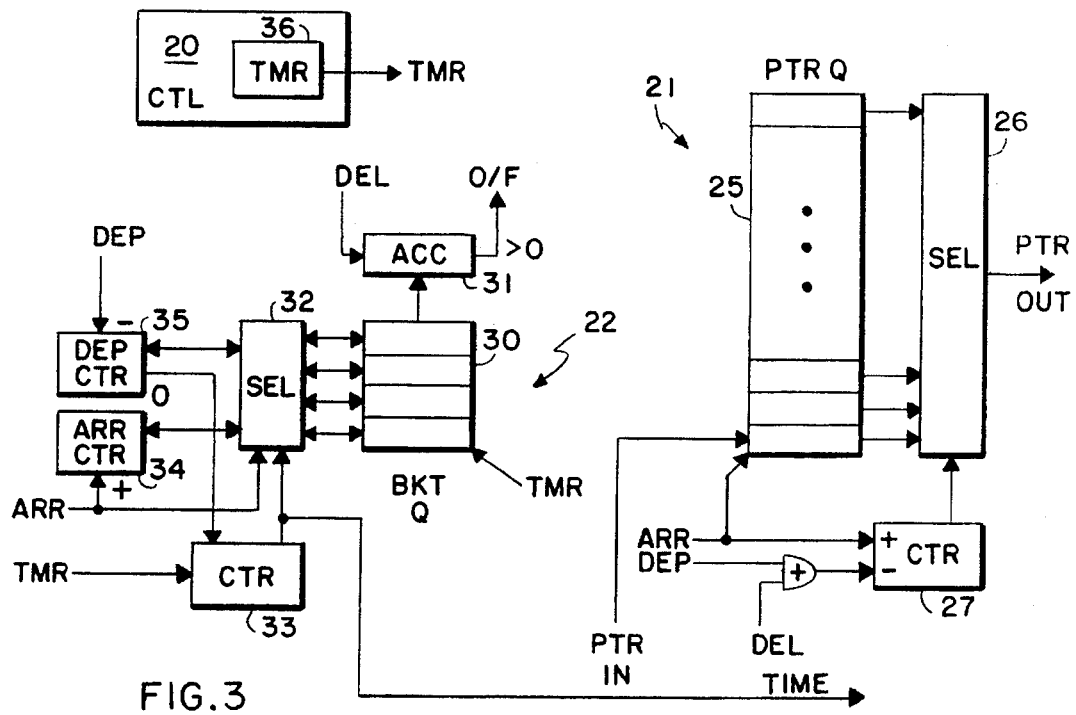
FIG. 3 is a simplified block diagram of an output module in the node.

FIG. 3 shows the logical organization of an output module 16. For present purposes, the relevant portions of the output module consist of three areas: a control unit 20, a pointer queue area 21, and a timer bucket area 22. The queue area 21 comprises a shift register 25 together with a selector 26 and a counter 27. The timer bucket area 22 comprises a shift register 30 and associated overflow accumulator 31, a selector 32 and a counter 33, and an arrival counter 34 and departure counter 35; these operate in conjunction with a timer 36 in the control unit 20.

When a packet is received, the input module 15 of the link on which it is received stores the packet in the packet memory 17, generates a pointer to its location in that memory, and passes the pointer to the appropriate output module 16 along with a signal ARR which indicates that the packet has been duly received. The pointer is fed into the bottom stage of the pointer queue shift register 25. At the same time the signal ARR is applied to the shift input of the shift register, shifting all the existing pointers in the register up by 1 stage. The signal ARR is also fed to the counter 27, which points to the top of the queue (i.e. the top pointer in register 25), to increment its count by 1.

When a packet is to be transmitted, a signal DEP is generated. The count in the counter 27 controls the selector 26 to select the pointer at the top of the queue in the register 25. This pointer is used to retrieve the packet from the packet memory 17. At the same time, the signal DEP is fed to the counter 27, to decrement its count by 1. This causes the counter to select the next pointer down in the pointer queue. The pointer which has just been used is thus effectively removed from the queue; although it is still in the register, it cannot be selected again, and will eventually be shifted out of the top end of the register and lost.

It will be understood that in practice, there are various refinements to this basic scheme, such as means for dealing with queue overflow. These are not described here, as they are not relevant for present purposes. It will also be realized that the memory organization just described is essentially a FIFO (first-in-first-out memory).

Packet age control: the problem

As discussed above, when a packet is about to be transmitted, its age field (containing its remaining lifetime) is decremented by the time the packet has spent in the node as it is retrieved from the packet memory; and the packet is simply discarded if this reduces its lifetime to 0. The time which each packet spends in the node must therefore be measured.

This time could be determined by storing the time at which its packet arrived in the node. The time which the packet spends in the node can then be determined when the pointer is retrieved from the pointer queue, by subtracting the stored time from the current time. However, as explained above, this involves a heavy burden on the node memory and/or logic. If the time of arrival of the packet is stored with the pointer in the pointer queue area 21, the size of the pointer queue area has to be greatly increased; while if it is stored with the packet itself in the packet memory 17, the effective speed of that memory is greatly reduced.

Packet age control: the present system

In the present system, the time for which a packet remains in the node is determined in a manner which does not require any storage of absolute times. This is achieved by grouping the packets into groups or "buckets", each bucket containing packets arriving within the same time interval, and keeping track of the age of each bucket. Further, the buckets are created at regular intervals, so that the ages of the buckets do not have to be explicitly maintained by updating them individually; instead, the age of each bucket (in units of the time intervals) is the number of the bucket (counting upwards from the most recently created bucket).

In addition, since the packets in the queue are transmitted (depart) in strict sequence, only the age of the oldest bucket has to be available directly; the present system therefore also requires a bucket counter which counts the total number of buckets in existence. (The oldest bucket ceases to exist when the number of packets in it falls to 0 (though the existence of all other, younger, buckets has to be maintained whether or not they have any packets in them).) There is therefore a bucket counter, which contains the number of buckets and thus indicates the age of the oldest packet. This counter is incremented by 1 at regular intervals and decremented by 1 each time the oldest bucket is emptied (or found to be empty).

Obviously the buckets do not have to contain the packets themselves; they can contain only pointers to the packets.

First implementation

One way to implement this is to maintain an explicit bucket structure in the pointer queue (in register 21) by inserting a bucket boundary marker into the queue at regular intervals. Each time a bucket boundary marker is inserted into the queue, the bucket counter is incremented, and each time a bucket boundary marker is selected by the queue counter 27, it is effectively removed from the top of the queue and the bucket counter is decremented.

In this arrangement, the buckets do not have fixed physical locations. A bucket exists simply as a stretch of the pointer list marked off at each end by a bucket boundary marker.

Second implementation: principle

It is preferred, however, to maintain the bucket structure by means of a separate bucket mechanism which maintains a list (the bucket list) of the numbers of packets in each bucket. Each time a new packet is received (arrives), the lowest entry in the list is incremented by 1; each time a packet is transmitted (departs), the highest entry is decremented by 1. When the highest entry has been decremented to 0, the bucket counter is decremented by 1. At regular intervals, all entries in the list are moved up 1 place, a new entry (with an initial value or count of 0) created at the bottom of the list, and the bucket counter is incremented by 1.

This bucket mechanism can be regarded as a set of relative indicators to the bucket boundaries in the pointer list. Each entry contains the number of packets in the associated bucket. The first entry in the bucket mechanism list indicates the number of pointers in the first bucket, and thus indicates the top of the first bucket; each successive entry in the bucket mechanism list similarly indicates the position of the top of its respective bucket relative to the bottom of that bucket (i.e. the top of the bucket below it).

In this arrangement, the buckets exist, as before, as stretches of the pointer list, with the lengths of those stretches being determined by the entries in the bucket list rather instead of by bucket boundary markers in the pointer list itself.

Second implementation: details

Referring again to FIG. 3, the bucket mechanism list is maintained in a shift register 30, and the bucket counter is counter 33. The timer 36 in the control unit 20 produces timer pulses TMR at regular intervals, and these are fed to the shift input of the shift register 30 to shift the bucket counts up the register, and to the increment input of the counter 33 to increment its count by 1. On such shifting, the count in the lowest bucket in the list (i.e. the bottom stage of the shift register) is moved out of that stage, leaving that stage reset to 0.

The shift register 30 is coupled through a selector 32 to an arrival counter 34 and departure counter 35; the selector 32 is bidirectional, so that the contents of the selected stage of the shift register 30 can be transferred to the arrival counter 34 or departure counter 35 for modification and then returned back into the shift register. The selector 32 is controlled by the bucket counter 33 to select the top bucket in the bucket list, and also by the arrival signal ARR to select the bottom bucket in the list (i.e. the lowest stage of the shift register).

When a packet is received, the count in the bottom bucket must be incremented. To achieve this, the arrival signal ARR controls the selector 32 to select the bottom stage of the shift register, and the count in this stage is passed to the arrival counter 34. In that counter, the count is incremented by 1 by the arrival signal ARR, and is then returned via the selector 32 back to the first stage of the shift register.

When a packet is transmitted, the count in the top bucket must be decremented. To achieve this, the bucket counter 33 controls the selector 32 to select the top non-empty bucket in the shift register, and the departure signal DEP causes the count in this top bucket to be passed to the departure counter 35. In that counter, the count is decremented by 1 by the departure signal DEP, and is then returned via the selector 32 back to the same stage of the shift register.

In addition, as discussed above, the count in the bucket counter 33 is passed to the arithmetic unit (not shown) of the output module as the time value TIME for which the packet has been in the node.

Further, if the count in the top bucket has decreased to 0, the bucket counter must be reset to point to the topmost non-empty bucket. This is achieved by testing the reduced count in the departure counter 35 to see whether it is 0, and if it is, passing a signal to the bucket counter 33 to decrement its count by 1. If this happens, then the control unit 20 causes the count in the next bucket down—i.e., what has just become the top bucket in the list—to be copied across to the departure counter 35 and tested to see whether it is 0. If it is, then the bucket counter is again decremented, and this process continues until a bucket with a non-zero count is reached or the bucket counter reaches 0.

It has been assumed so far that the length of the bucket list remains within the bounds of the list register 30. If it overflows, then that contents of the top bucket will be shifted out of the top of the list register. These contents are fed to an overflow accumulator 31, and added to any count already in that accumulator resulting from any previous overflows. The total or sum of the contents of all the buckets including the overflow bucket 31 therefore always matches the number of pointers in the pointer queue 25.

The size of the bucket list register 30 is chosen such that if a packet remains in the node for so long that its bucket overflows the list, the packet can be discarded. Thus the size of the bucket list is preferably chosen to match the maximum lifetime allowed for packets in the system. In practice, it may sometimes be chosen to be smaller than this maximum allowed lifetime without serious ill effect.

The accumulator 31 generates an overflow signal O/F when its contents are not 0. This signal is fed to the control unit 30, which, in normal circumstances, promptly generates a signal DEL for packet deletion. This signal is similar in some ways to the departure signal DEP. Specifically, it decrements the pointer list counter 27 by 1, so effectively deleting the pointer to the oldest packet from the pointer list. It is also fed to the accumulator 31 to decrements its count by 1, so reducing by 1 the packet count (the number of packets) in the overflow bucket. (This is somewhat similar to the decrementing of the topmost bucket count in the list register 30 when there is no overflow.) Overflow signals O/F and packet delete signals DEL will normally continue to be produced in this way until the count in the overflow accumulator 31 has been reduced to 0.

During an overflow condition, the count of the bucket counter 33 must be kept at its maximum. This can be achieved by, for example, constructing this counter as a non-cyclic counter.

Timing and other general considerations

In a computer network, the accuracy with which packet ages are to be decremented may typically be 0.5 s. It is also conventional to take the minimum time which a packet can spend in a node as the same value. In the present system, it is therefore natural to choose this unit system time (0.5 s) as the period of the timer 36.

However, this choice means that the time which a packet spends in the node is always over-estimated, by an average of half a unit (0.25 s). It is therefore preferred to set the period of the timer 36 to something less than the unit system time. A period of half the unit system time, 0.25 s, is a convenient value. This allows the buckets to be paired so that half the packets have their times of residence in the node rounded up and the other half to have their times of residence rounded down, averaging out the errors to zero. (At the bottom of the bucket list, the single unpaired bucket is preferably combined with the two buckets above it to give a triplet; this ensures that the time of residence is never zero.)

It will be realized that the number of storage locations required to accommodate bucket boundaries in the pointer queue or in the bucket list queue is in general much smaller than the number of packets. This is because the maximum packet rate is in general much higher than the timer frequency. In other words, the average number of packets in a bucket is (at least when the system is heavily loaded) large. The present system therefore requires considerably less storage space than would be required for storing, with each packet, its time of arrival. (In practice, of course, the number of buckets required will usually be much greater than the 4 buckets shown in FIG. 3.)

Development: two tier system

A further reduction in the amount of storage space required by the present system can be achieved by splitting the bucket list into two parts, the first fine and the second coarse, with a ratio of n:1 so that n fine buckets are merged into a single coarse bucket as the buckets move from the fine part to the coarse part. This enables the time of residence of a packet to be measured with high accuracy if that time is relatively small, but with lower accuracy if that time is large. In other words, the accuracy with which the time of residence is measured is no longer an absolute value, but a fractional value of the time (with a coarse zoning of the times into just two zones).

Figure 3A:
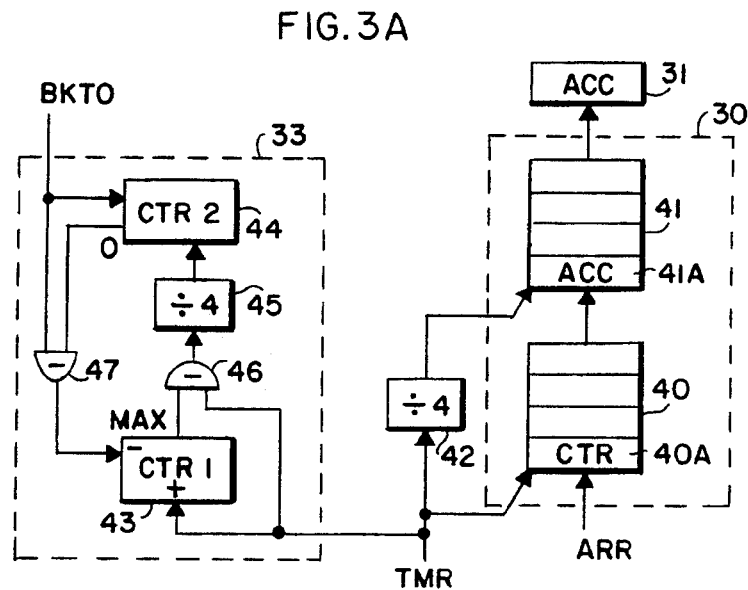
FIG. 3A is a further simplified block diagram of a modification of the FIG. 3 system.

FIG. 3A is a partial block diagram showing how this can be achieved. This diagram is simplified compared to FIG. 3, in that the means by which the contents of the buckets can be changed are assumed to be built into the bucket list shift register stages, instead of being separated out by a selector and arrival and departure counters.

Referring to FIG. 3A, the bucket list shift register 30 is divided into two sections, a fine section 40 and a coarse section 41. The timer pulses TMR are fed direct to the shift input of the fine section 40, and via a divide-by-4 circuit 42 to the coarse section 41. The bottom stage 40A of the fine section 40 is constructed with a counter functionality, so that it can count the packet arrival signals ARR. The bottom stage 41A of the coarse section 41 is constructed with an accumulator functionality, so that it can accumulate successive fine bucket counts from the top of the fine bucket section 40. Each stage of both sections of the shift register can also be selected by the counter 33, for its count to be read out and decremented by 1.

The bucket counter 33 is similarly divided into two sections, a fine section 43 and a coarse section 44, with the fine section feeding the coarse section through a divide-by-4 circuit 45 corresponding to the divider 42, and fed with timer pulses TMR in a manner described below.

Initially the count of the coarse counter section 44 is 0, so that the highest bucket is in the fine section 40 of the bucket list register. As long as this condition obtains, the operation is as described above. If the number of buckets exceeds 4, then the fine counter section 43 reaches its maximum count. It then remains at that count, and enables an AND gate 46. At the same time, the count of the top stage of the fine register section 40 is transferred up into the bottom stage of the coarse register section 41. The timer pulses TMR are then fed to the coarse counter section 44 via the divider 45, while the count of the fine counter 43 remains at its maximum count.

On the next three timer pulses TMR, the contents of the next bucket in the fine bucket list register 40 are transferred up into the bottom of the coarse bucket list register 41, and added to the count already there. On the next (fourth) timer pulse, the coarse counter 44 steps on, so the buckets in the coarse section 41 are moved up 1 stage. At the same time, the count of the top bucket of the fine bucket list register is transferred up into the just-emptied bottom section of the coarse bucket list register.

The action continues in this way, with the coarse bucket list register being shifted on every fourth timer pulse. The buckets thus move up the fine section 40 at the full rate, and as they reach the top of that section, they are combined by fours into coarse buckets which move up the coarse section 41 at a quarter of the rate of the fine section.

As before, any overflow from the top of the register 33 is accumulated in the overflow accumulator 31.

When a packet is to be transmitted, the count of the coarse counter 44 is used as the age of the packet if that count is not 0; if it is, the count of the fine counter 43 is used. (Obviously the count of the coarse section has to be effectively multiplied by 4 to give the age; this can conveniently be accomplished by a 2-bit shift.)

When a packet is to be transmitted, the associated bucket also has to have its contents decremented by 1. As noted above, we assume here that the decrementing function is built into the shift register stages. The coarse section 41 is selected if the count of the coarse counter is not 0; if it is, the fine section 40 is selected. The count in the corresponding counter selects the appropriate stage in the selected register section.

As before, on the transmission of a packet (signal DEP), the buckets must also be inspected and the contents of the bucket counter adjusted if the top bucket has been emptied. We assume here that when a shift register stage is selected, the shift register produces a signal BKT0 if the selected bucket is empty. This signal is fed to the coarse counter 44, to decrement its count if its count is not already at zero. Thus this counter counts down until it reaches the first non-empty bucket.

If the count of the coarse counter 44 reaches zero, then its zero state enables an AND gate 47, which allows the signals BKT0 to pass to the fine counter 43, which in turn counts down until it reaches the first non-empty bucket in the fine section 40. The count of this fine counter 43 is frozen at its maximum for as long as the count of the coarse counter 44 is not 0.

It is of course convenient for the division ratio n to be a power of 2. The number of fine buckets can, as described above, be a suitable multiple of the division ratio (again conveniently a fairly small power of 2). If desired, the bucket list can be divided into more than 2 successively coarser sections.

It will be realized that this technique of using two or more scales for the bucket width (measured in terms of time) cannot be implemented so readily if the buckets are defined by bucket markers in the pointer queue.

Modified implementation

The system has been described so far in terms of fixed queues and lists through which individual items of information (pointers and bucket sizes) move. It will of course be realized that it can equally well be implemented by using cyclic rings for storing such items of information. With these, the individual items of information remain in fixed locations in the rings, and the start and finish of the list both move round the ring, with the start and finish locations being indicated by respective pointers.

We claim:

1. A packet forwarding station for a computer network, comprising:

a receiving module for receiving a plurality of packets, each packet having an age field; and an output module, said output module including:

a timing means for defining successive time intervals;

means for grouping each packet into one of a plurality of groups in dependence on said successive time interval in which each packet arrives at said station;

age measuring means, including a group counter, for maintaining an age for each of said groups, said group counter maintaining a running count of said groups;

a shift register having a plurality of stages, said stages including a top stage and a bottom stage, each stage for containing a packet count of how many of said packets were grouped into one of said groups, wherein when said timing means defines a new time interval, a packet count contained in said top stage is shifted out of said shift register, a packet count contained in each of the other stages is shifted into an emptied stage of said shift register, and a packet count contained in said bottom stage is set to zero, said packet count contained in said bottom stage then incrementing whenever a new packet is received by said receiving module during said new time interval; and an overflow accumulator for receiving a packet count shifted out of said top stage of said shift register;

said output module for using said group counter to alter the age field of a first packet before transmitting said first packet, and for discarding a second packet when said second packet is included in a packet count that is shifted out of said top stage.

2. A packet forwarding station for a computer network, comprising:

a receiving module for receiving a plurality of packets, each packet having an age field; and an out module, said output module including:

a timing means for defining successive time intervals;

means for grouping each packet into one of a plurality of groups in dependence on said successive time interval in which each packet arrives at said station;

age measuring means, including a group counter, for maintaining an age for each of said groups, said group counter maintaining a running count of said groups;

a shift register having a plurality of sections, said sections including a fine section and a coarse section, said fine section having a plurality of stages including a fine top stage and a fine bottom stage, said coarse section having a second plurality of stages including a coarse top stage and a coarse bottom stage, each fine section stage for containing a packet count of how many of said packets were grouped into one of said groups, each coarse section stage for containing a sum of said packet counts that are shifted out of said fine section;

wherein whenever said timing means defines a new time interval, a packet count contained in said fine top stage is shifted out of said fine section and added to a sum in said coarse bottom stage, a packet count contained in each of the other of said fine section stages is shifted into an emptied fine section stage, and a packet count in said fine bottom stage is set to zero, said packet count in said fine bottom stage then incrementing whenever a new packet is received by said receiving module during said new time interval, and after said timing means defines a predetermined plurality of new time intervals, a sum contained in said coarse top stage is shifted out of said coarse section, a sum contained in each of the other of said coarse section stages is shifted into an emptied coarse section stage, and a packet count in said fine top stage is transferred into said coarse bottom stage; and an overflow accumulator for receiving a sum that is shifted out of said coarse top stage;

said output module for using said group counter to alter the age field of a first packet before transmitting said first packet, and for discarding a second packet when said second packet is included in a sum that is shifted out of said coarse top stage.

* * * * *